United States Patent
Bart et al.

(10) Patent No.: US 8,794,922 B2
(45) Date of Patent: Aug. 5, 2014

(54) ASSEMBLY BETWEEN A COMPRESSOR SHAFT TRUNNION AND A BEVEL GEAR FOR DRIVING AN ACCESSORY GEARBOX OF A TURBOMACHINE

(75) Inventors: Jacques René Bart, Soisy sur Seine (FR); Didier Escure, Nandy (FR)

(73) Assignee: SNECMA, Paris (FR)

( * ) Notice: Subject to any disclaimer, the term of this patent is extended or adjusted under 35 U.S.C. 154(b) by 575 days.

(21) Appl. No.: 13/185,754

(22) Filed: Jul. 19, 2011

(65) Prior Publication Data

US 2012/0020774 A1    Jan. 26, 2012

(30) Foreign Application Priority Data

Jul. 20, 2010    (FR) .................................... 10 55912

(51) Int. Cl.
*F04D 29/044*    (2006.01)
(52) U.S. Cl.
USPC .................................................... 416/170 R
(58) Field of Classification Search
CPC ......... F01D 5/026; F01D 5/06; F01D 25/125; F01D 25/162
USPC ...... 416/170 R, 198 R, 198 A, 244 R, 244 A; 415/61, 107, 109, 110, 111, 112, 415/122.1, 124.1, 229
See application file for complete search history.

(56) References Cited

U.S. PATENT DOCUMENTS

| | | | | |
|---|---|---|---|---|
| 2,515,303 A | * | 7/1950 | Isnard | 403/254 |
| 2,785,550 A | * | 3/1957 | Petrie | 464/158 |
| 3,442,444 A | * | 5/1969 | Kievit | 415/164 |
| 3,622,185 A | * | 11/1971 | Rosan et al. | 403/316 |
| 3,843,140 A | * | 10/1974 | Mayer et al. | 277/408 |
| 3,900,270 A | * | 8/1975 | Rhodes | 403/317 |
| 4,456,425 A | * | 6/1984 | McCarty et al. | 415/122.1 |
| 6,338,578 B1 | | 1/2002 | Adde et al. | |
| 6,827,548 B2 | * | 12/2004 | Coxhead et al. | 415/9 |

(Continued)

FOREIGN PATENT DOCUMENTS

| | | |
|---|---|---|
| EP | 0 987 457 A1 | 3/2000 |
| EP | 1 813 770 A1 | 8/2007 |
| EP | 2 009 252 A1 | 12/2008 |

OTHER PUBLICATIONS

French Preliminary Search Report issued Mar. 24, 2011, in French 1055912, filed Jul. 20, 2010 (with English Translation of Category of Cited Documents).

*Primary Examiner* — Nathaniel Wiehe
*Assistant Examiner* — Eldon Brockman
(74) *Attorney, Agent, or Firm* — Oblon, Spivak, McClelland, Maier & Neustadt, L.L.P.

(57) ABSTRACT

The invention relates to an assembly between a compressor shaft trunnion and a bevel gear for driving an accessory gearbox of a turbomachine. The assembly comprises a bevel gear, a compressor shaft trunnion arranged coaxially inside the bevel gear, torque transmission means between the compressor shaft trunnion and the bevel gear, a lock nut for preventing the bevel gear from moving axially on the compressor shaft trunnion, the lock nut being suitable for being screwed onto the bevel gear and including a shoulder projecting radially outwards and suitable for coming into axial abutment firstly upstream against a stop nut screwed onto an upstream end of the compressor shaft trunnion, and secondly downstream against a bearing surface of the compressor shaft trunnion, and an anti-rotation pin for preventing the lock nut from rotating.

9 Claims, 3 Drawing Sheets

(56) References Cited

U.S. PATENT DOCUMENTS

| | | | |
|---|---|---|---|
| 7,128,529 B2* | 10/2006 | Le Jeune et al. | 415/229 |
| 7,147,436 B2* | 12/2006 | Suciu et al. | 415/216.1 |
| 7,690,206 B2* | 4/2010 | Servant | 60/792 |
| 7,836,596 B2* | 11/2010 | Suciu et al. | 29/889.22 |
| 8,186,903 B2* | 5/2012 | Makin et al. | 403/359.5 |
| 8,246,255 B2* | 8/2012 | Raberin et al. | 384/539 |
| 8,517,687 B2* | 8/2013 | Benjamin et al. | 416/198 A |
| 2005/0013696 A1* | 1/2005 | Le Jeune et al. | 416/244 A |
| 2007/0022735 A1* | 2/2007 | Henry et al. | 60/39.162 |
| 2007/0177935 A1 | 8/2007 | Galivel et al. | |
| 2007/0177936 A1* | 8/2007 | Servant | 403/118 |
| 2007/0212226 A1* | 9/2007 | Guihard et al. | 416/244 A |
| 2008/0317594 A1 | 12/2008 | Servant | |
| 2009/0162136 A1* | 6/2009 | Makin et al. | 403/20 |
| 2010/0005810 A1* | 1/2010 | Jarrell et al. | 60/792 |
| 2010/0061839 A1* | 3/2010 | Bartolomeo et al. | 415/122.1 |
| 2011/0223026 A1* | 9/2011 | Benjamin et al. | 416/198 A |

\* cited by examiner

ASSEMBLY BETWEEN A COMPRESSOR SHAFT TRUNNION AND A BEVEL GEAR FOR DRIVING AN ACCESSORY GEARBOX OF A TURBOMACHINE

BACKGROUND OF THE INVENTION

The present invention relates to the general field of turbomachines in which the motion take-off bevel gear for driving the accessory gearbox is mounted on the trunnion of the high-pressure compressor shaft. The invention relates more precisely to making it easier to dismount the trunnion when the radial size of such an assembly is small.

Certain maintenance operations on a turbojet of the two-spool bypass type require the high-pressure spool module of the engine to be dismantled. These operations are generally made easier when it is possible to withdraw the high-pressure spool module rearwards without it being necessary to begin by removing the fan module.

Furthermore, in the context of developing turbojets of small size, it is necessary to incorporate within such engines a connection between an upstream trunnion of the high-pressure compressor shaft and a bevel gear that acts as a motion take off for driving the accessory gearbox of the turbojet. The motion take-off bevel gear is more precisely mounted around the high-pressure compressor shaft trunnion, being coupled thereto and supporting the inner ring of a ball bearing having its outer ring secured to the intermediate casing of the turbojet.

Incorporating the motion take-off bevel gear on the high-pressure compressor trunnion must enable the high-pressure spool module to be extracted rearwards, and more particularly must enable the trunnion of the high-pressure compressor shaft to be extracted rearwards relative to the bevel gear that itself must remain in place connected to the intermediate casing of the turbojet.

Nevertheless, when radial size is small because of the small size of the turbojet, removing the high-pressure spool module rearwards without it being necessary to begin by removing the fan module, and more precisely the bevel gear supporting the ball bearing, is found to be difficult if not impossible to achieve.

OBJECT AND SUMMARY OF THE INVENTION

A main object of the present invention is thus to mitigate such drawbacks by proposing a solution for dismounting the high-pressure spool module from a turbojet of small radial size, and more particularly for dismounting the trunnion of the high-pressure compressor shaft, which method does not require the fan module to be removed beforehand, and in particular does not require the bevel gear to be removed.

This object is achieved by an assembly between a compressor shaft trunnion and a bevel gear for driving an accessory gearbox of a turbomachine, the assembly comprising: a bevel gear centered on a longitudinal axis of the turbomachine; a compressor shaft trunnion disposed coaxially inside the bevel gear; torque transmission means between the compressor shaft trunnion and the bevel gear; a lock nut for preventing the bevel gear from moving axially on the compressor shaft trunnion, the lock nut being suitable for being screwed into the bevel gear on its inside and including a shoulder that projects radially outwards and that is suitable for coming into axial abutment firstly upstream against a stop nut screwed onto an upstream end of the compressor shaft trunnion, and secondly downstream against a bearing surface of said compressor shaft trunnion; and an anti-rotation pin mounted inside the compressor shaft trunnion to prevent the lock nut from rotating.

The lock nut for preventing the bevel gear from moving axially is first held captive between the stop nut mounted on the trunnion of the compressor shaft and its bearing surface. Similarly, the anti-rotation pin for preventing the lock nut from rotating is mounted inside the trunnion of the compressor shaft. While the trunnion of the compressor shaft is being extracted rearwards, these two parts (the lock nut and the anti-rotation pin) thus remain mounted on the upstream end of the trunnion and they are removed together therewith. This makes it possible to remove the compressor shaft trunnion without it being necessary to begin by removing the bevel gear, and thus by removing the fan module. This makes it easier to remove the compressor shaft trunnion of the turbomachine.

Preferably, the assembly further comprises means for preventing the anti-rotation pin from moving axially on the compressor shaft trunnion. The anti-rotation pin may thus include a shoulder projecting radially outwards and suitable for being positioned radially inside at least one groove formed in the compressor shaft trunnion.

Under such circumstances, the compressor shaft trunnion advantageously includes an upstream groove and a downstream groove suitable for receiving the shoulder of the anti-rotation pin, the upstream groove being positioned in such a manner as to receive the shoulder when the anti-rotation pin is in a position for preventing the lock nut from rotating, and the downstream groove being positioned downstream from the upstream groove in such a manner as to receive the shoulder when the anti-rotation pin is in a position in which it is disengaged relative to the lock nut.

The anti-rotation pin may include at least one finger at an upstream end, the finger being suitable for co-operating in a tangential direction with notches formed at a downstream end of the lock nut.

The assembly may include means for preventing the stop nut from rotating. The bevel gear may include a groove opening to the inside and suitable for receiving a tool for preventing said bevel gear from moving axially. Finally, the compressor shaft trunnion may include a flange suitable for co-operating with an extractor tool for extracting said compressor shaft trunnion.

The invention also provides a turbomachine including an assembly as defined above between a high-pressure compressor shaft trunnion and a bevel gear for driving an accessory gearbox.

BRIEF DESCRIPTION OF THE DRAWINGS

Other characteristics and advantages of the invention appear from the following description made with reference to the accompanying drawings that show an embodiment having no limiting character. In figures.

DETAILED DESCRIPTION OF AN EMBODIMENT

Figure 1:
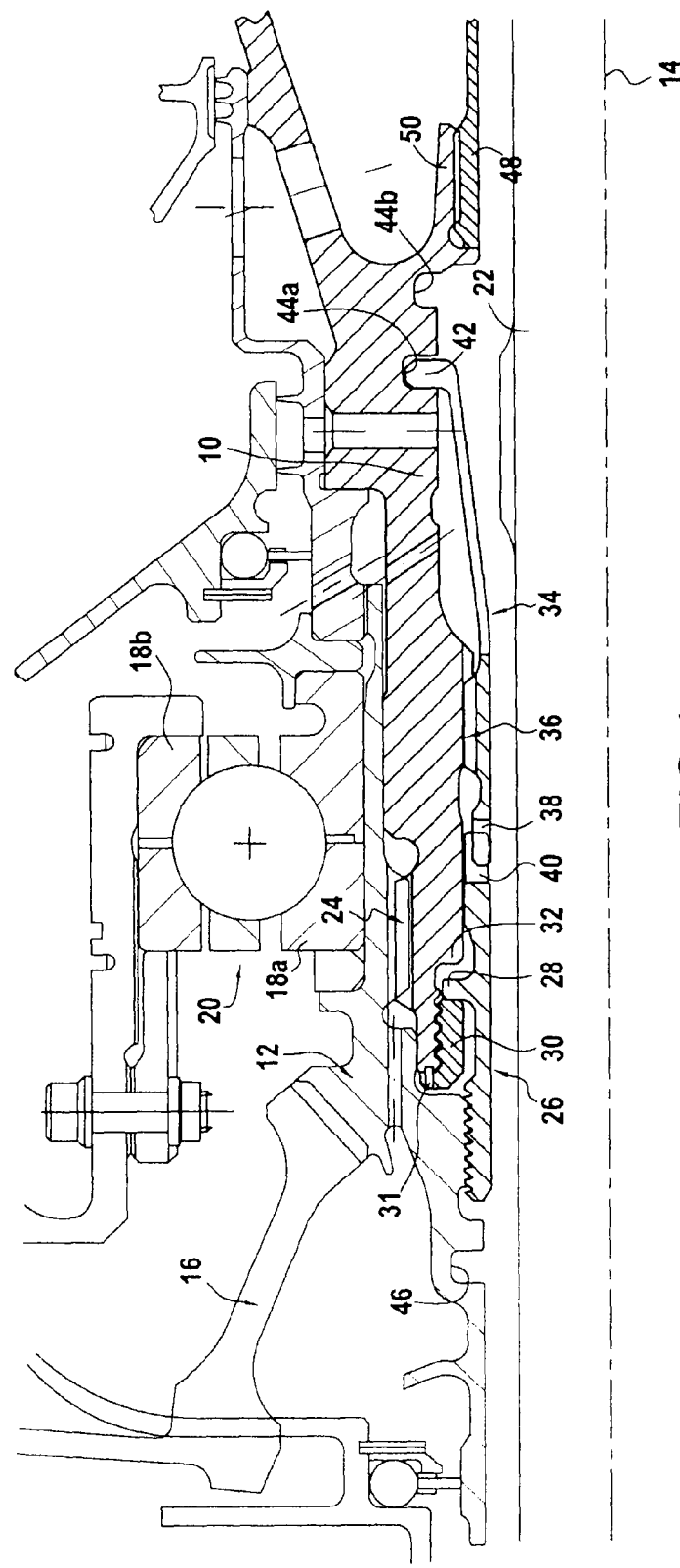
FIG. 1 is a fragmentary longitudinal section view of an assembly of the invention in an assembled state.

FIG. 1 is a longitudinal section of an assembly of the invention between a trunnion 10 of a high-pressure compressor shaft in a turbojet of the bypass two-spool type, and a bevel gear 12 forming a motion take-off for driving the accessory gearbox of the turbojet.

Naturally, the invention is not limited to an application to a bypass two-spool type turbojet, but applies to other turbomachines presenting this type of assembly.

The trunnion 10 of the high-pressure compressor shaft is used for guiding rotation of the high-pressure compressor shaft of the turbojet. The bevel gear 12 is coupled to a shaft 16 serving to impart rotary drive to the accessory gearbox of the turbojet (not shown). The bevel gear also carries the inner ring 18a of a ball bearing 20 of the high-pressure spool of the turbojet, with the outer ring 18b thereof being secured to the intermediate casing of the turbojet.

The trunnion 10 and the bevel gear 12 are centered on the longitudinal axis 14 of the turbojet and they are arranged coaxially one inside the other. More precisely, the trunnion of the high-pressure compressor shaft is located inside the bevel gear, these two parts surrounding the shaft 22 of the low-pressure turbine of the turbojet.

At its upstream end, the trunnion 10 imparts rotary drive to the bevel gear 12 about the axis 14 via known torque transmission means, e.g. axial fluting 24 providing cooperation between them.

The assembly of the invention also comprises a nut 26 serving to lock the axial position of the bevel gear 12 on the trunnion 10. This lock nut is screwed into the upstream end of the bevel gear on the inside thereof, and it includes an annular shoulder 28 projecting radially outwards.

When the lock nut 26 is in its screwed position (FIG. 1), the upstream side of its shoulder 28 comes into axial abutment against a stop nut 30 that is screwed onto the upstream end of the trunnion 10. While the lock nut is being unscrewed (FIG. 2), the downstream side of the shoulder 28 is suitable for coming into axial abutment against an annular bearing surface 32 of the trunnion.

According to an advantageous provision of the invention, means are provided for preventing the stop nut 30 that is screwed onto the upstream end of the trunnion 10 from rotating. For example, these rotation-blocking means may be implemented by an anti-rotation finger 31.

The assembly of the invention also includes an anti-rotation pin 34 for preventing the lock nut 26 from rotating. This pin is annular and mounted inside the trunnion 10 of the high-pressure compressor shaft, being coaxial therewith. It is coupled to the trunnion via fluting 36.

In order to perform its function preventing rotation of the lock nut 26, the upstream end of the pin 34 presents at least one finger 38 suitable for co-operating in a tangential direction with complementary notches 40 formed in a downstream end of the lock nut.

Figure 2:
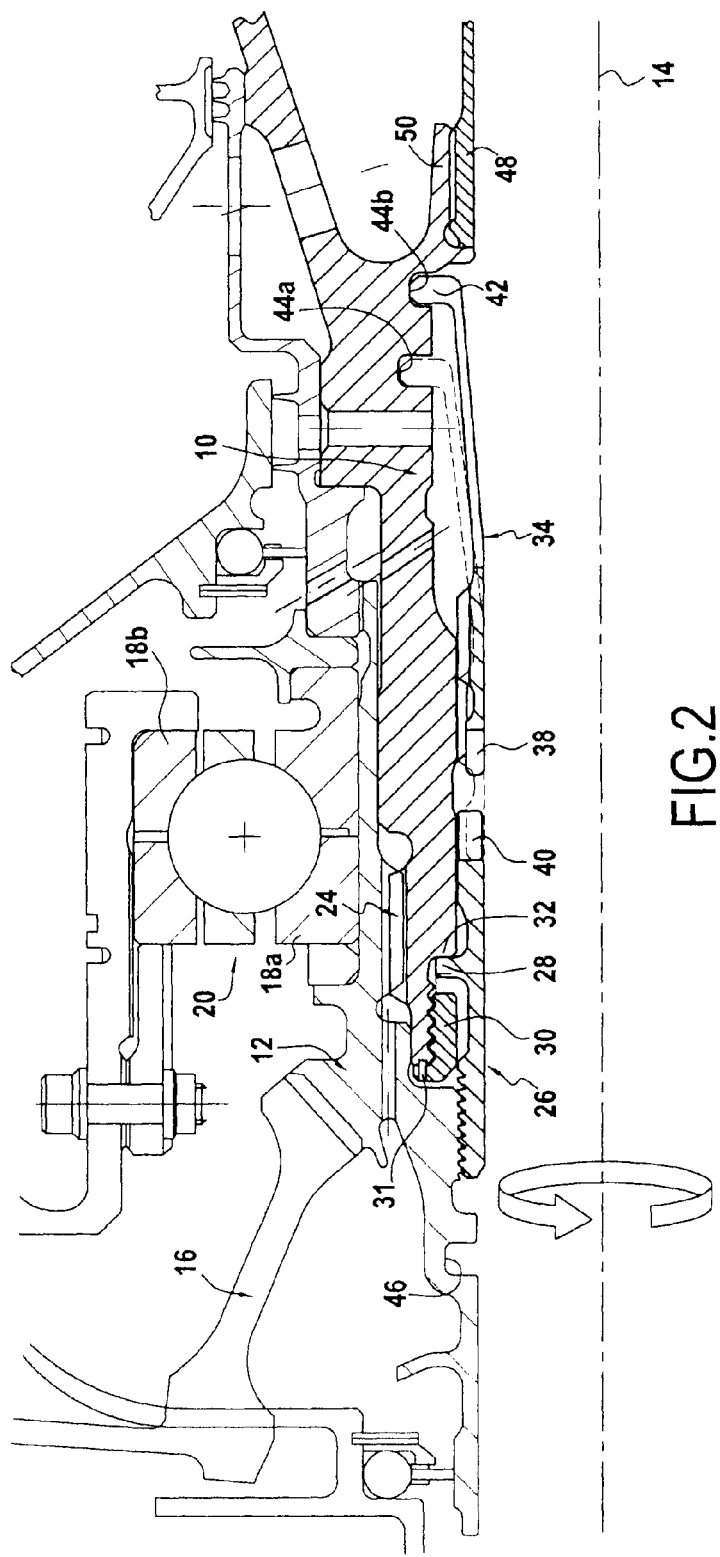
FIGS. 2 and 3 are views showing the FIG. 1 assembly being disassembled from the rear.
Figure 3:
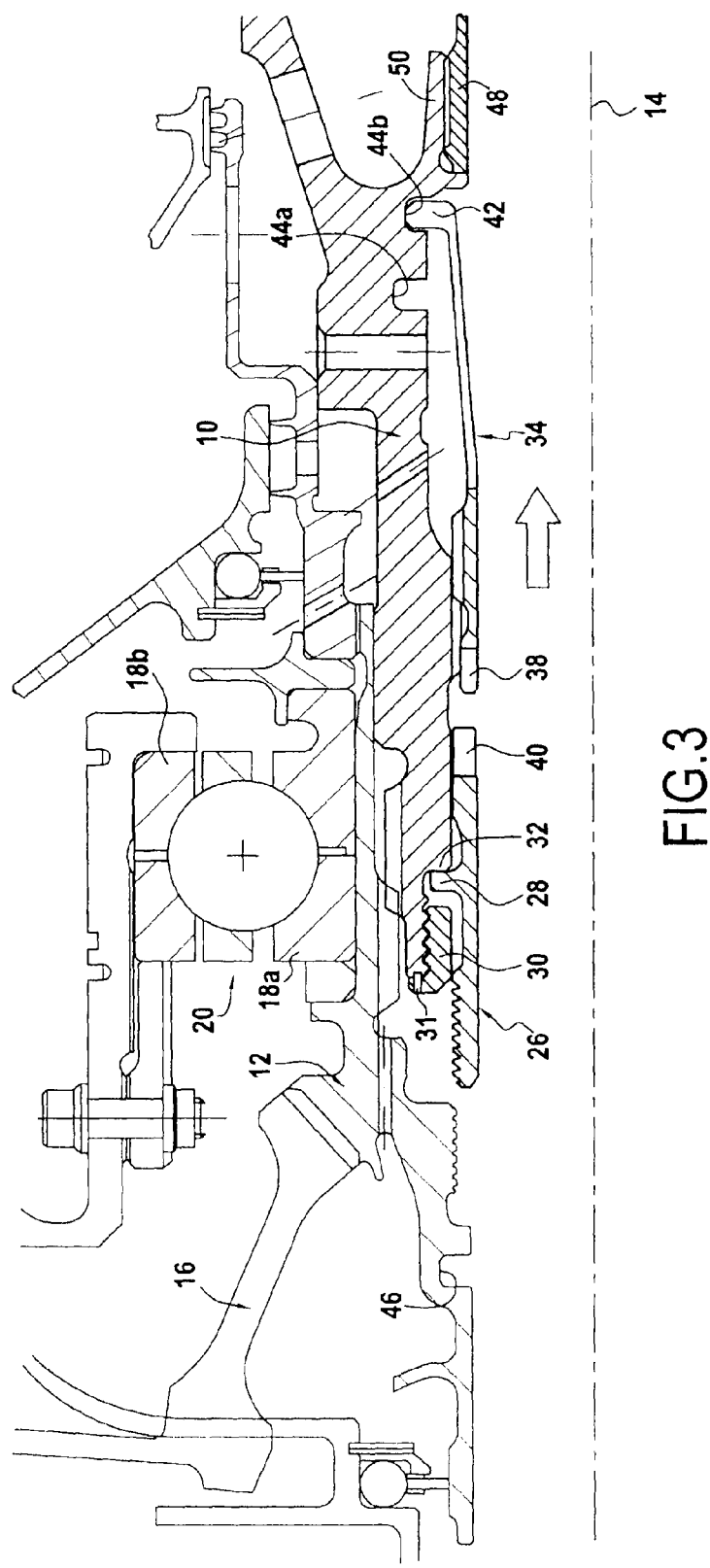

At its downstream end, the anti-rotation pin 34 has a shoulder 42 projecting radially outwards. This shoulder is suitable for co-operating with annular grooves formed in the trunnion of the high-pressure compressor shaft 10 and open towards the inside (i.e. towards the axis 14). These grooves serve to prevent the anti-rotation pin from moving axially on the trunnion. In the embodiment of FIGS. 1 to 3, these grooves are two in number: an upstream groove 44a positioned so as to receive the shoulder 42 of the pin when it is in a position for preventing the lock nut from rotating (as shown in FIG. 1), and a downstream groove 44b positioned downstream from the upstream groove 44a in such a manner as to receive the shoulder of the pin when the pin is in a position that is disengaged from the lock nut (as shown in FIGS. 2 and 3).

The trunnion 10 of the high-pressure compressor shaft is disassembled as follows.

Initially, the shaft 22 of the low-pressure turbine of the turbojet is removed rearwards (i.e. downstream). Thereafter, a tool for preventing the bevel gear from moving axially is inserted inside the trunnion 10 and mounted in a groove 46 provided for this purpose at the upstream end of the bevel gear 12 (the groove 46 is open towards the inside). This tool serves to ensure that the bevel gear is prevented from moving axially while the trunnion is being extracted.

As shown in FIG. 2, the following step consists in disengaging the anti-rotation pin 34 downstream and in blocking it in said position by housing its shoulder 42 in the downstream groove 44b of the trunnion 10. In this position, the lock nut 26 is freed and can therefore be unscrewed.

During the operation of unscrewing the lock nut 26, its shoulder 28 comes into axial abutment against the annular bearing surface 32 of the trunnion (FIG. 2). The lock nut continues to be unscrewed until it is separated from the thread of the bevel gear. While it is being unscrewed, the trunnion 10 is also entrained downstream by the shoulder 28 of the lock nut.

When the lock nut 26 is completely disengaged from the thread of the bevel gear 12 (FIG. 3), an extractor tool 48 for extracting the trunnion of the high-pressure compressor shaft is installed on a flange 50 thereof, e.g. located downstream from the grooves 44a, 44b. This extractor tool enables the trunnion to be extracted downstream, together with the lock nut 26 and the anti-rotation pin 34 that are mounted thereon.

As a result, it is possible to dismount the trunnion 10 of the high-pressure compressor shaft, and thus to dismount the high-pressure spool of the turbojet, without it being necessary to begin by dismantling the fan module, and more particularly the bevel gear 12 supporting the ball bearing 20.

What is claimed is:

1. An assembly between a compressor shaft trunnion and a bevel gear for driving an accessory gearbox of a turbomachine, the assembly comprising:

a bevel gear centered on a longitudinal axis of the turbomachine;

a compressor shaft trunnion disposed coaxially inside the bevel gear;

torque transmission means between the compressor shaft trunnion and the bevel gear;

a lock nut for preventing the bevel gear from moving axially on the compressor shaft trunnion, the lock nut being suitable for being screwed into the bevel gear on its inside and including a shoulder that projects radially outwards and that is suitable for coming into axial abutment firstly upstream against a stop nut screwed onto an upstream end of the compressor shaft trunnion, and secondly downstream against a bearing surface of said compressor shaft trunnion; and an anti-rotation pin mounted inside the compressor shaft trunnion to prevent the lock nut from rotating.

2. An assembly according to claim 1, further comprising means for preventing the anti-rotation pin from moving axially on the compressor shaft trunnion.

3. An assembly according to claim 2, wherein the anti-rotation pin includes a shoulder projecting radially outwards and suitable for being positioned radially inside at least one groove formed in the compressor shaft trunnion in such a manner as to block the anti-rotation pin from moving axially on the compressor shaft trunnion.

4. An assembly according to claim 3, wherein the compressor shaft trunnion includes an upstream groove and a downstream groove suitable for receiving the shoulder of the anti-rotation pin, the upstream groove being positioned in such a manner as to receive the shoulder when the anti-rotation pin is in a position for preventing the lock nut from rotating, and the downstream groove being positioned downstream from the upstream groove in such a manner as to receive the shoulder when the anti-rotation pin is in a position in which it is disengaged relative to the lock nut.

5. An assembly according to claim 1, wherein the anti-rotation pin includes at least one finger at an upstream end, the finger being suitable for co-operating in a tangential direction with notches formed at a downstream end of the lock nut.

6. An assembly according to claim 1, further including means for preventing the stop nut from rotating.

7. An assembly according to claim 1, wherein the bevel gear includes a groove opening to the inside and suitable for receiving a tool for preventing said bevel gear from moving axially.

8. An assembly according to claim 1, wherein the compressor shaft trunnion includes a flange suitable for co-operating with an extractor tool for extracting said compressor shaft trunnion.

9. A turbomachine including an assembly between a high-pressure compressor shaft trunnion and a bevel gear for driving an accessory gearbox according to claim 1.

* * * * *